(12) United States Patent
Sprague

(10) Patent No.: US 8,810,525 B2
(45) Date of Patent: Aug. 19, 2014

(54) ELECTRONIC INFORMATION DISPLAYS

(75) Inventor: Robert A. Sprague, Saratoga, CA (US)

(73) Assignee: E Ink California, LLC, Fremont, CA (US)

( * ) Notice: Subject to any disclaimer, the term of this patent is extended or adjusted under 35 U.S.C. 154(b) by 901 days.

(21) Appl. No.: 12/897,545

(22) Filed: Oct. 4, 2010

(65) Prior Publication Data

US 2011/0080362 A1 Apr. 7, 2011

Related U.S. Application Data

(60) Provisional application No. 61/248,793, filed on Oct. 5, 2009.

(51) Int. Cl.
*G06F 3/041* (2006.01)
*G06F 3/038* (2013.01)

(52) U.S. Cl.
USPC .......................................... 345/173; 345/212

(58) Field of Classification Search
USPC ............ 345/173, 178, 211, 212, 690, 174, 87
See application file for complete search history.

(56) References Cited

U.S. PATENT DOCUMENTS 6,930,818 B1 8/2005 Liang et al.

FOREIGN PATENT DOCUMENTS

WO WO 01/67170 9/2001

OTHER PUBLICATIONS 20.1 Microcup active and passive matrix electrophoretic displays by roll to roll manufacturing process; Liang et al; pp. 1 and 2.*

Configurable timing controller design for active matrix electrophoretic display; Wen-Chung et al; pp. 1 and 2.*
Allen, K. (Oct. 2003). Electrophoretics Fulfilled. *Emerging Displays Review: Emerging Display Technologies, Monthly Report—Oct. 2003*, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTO News & Letters*, 102, 37-41. (in Chinese, English abstract attached).
Chen, S.M. (May 2003) The New Application and the Dynamics of Companies. *TRI.* 1-10. (In Chinese, English abstract attached).
Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.
Ho, C.,& Liang, R.C. (Dec. 2003). *Microcup® Electronic Paper by Roll-to-Roll Manufacturing Processes*. Presentation conducted at FEG, Nei-Li, Taiwan.

(Continued)

*Primary Examiner* — Michael Faragalla
(74) *Attorney, Agent, or Firm* — Perkins Coie LLP

(57) ABSTRACT

The present invention offers an electronic information display which can be updated at a very low cost. This is accomplished by an electronic display device and a separate writer device. The writer device may comprise an electronic backplane, a mechanical fixture which can be easily be pressed against the electronic information display, and a wireless network and computational infrastructure which connect the writer device to a data base.

16 Claims, 10 Drawing Sheets

(56) References Cited

OTHER PUBLICATIONS

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, p. 4-3. (Int'l Conference on Consumer Electronics. Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). Passive Matrix Microcup® Electrophoretic Displays. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00 pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging*, SPIE vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

* cited by examiner

ELECTRONIC INFORMATION DISPLAYS

This application claims priority to U.S. Provisional Application No. 61/248,793, filed Oct. 5, 2009; the content of which is incorporated herein by reference in its entirety.

FIELD OF THE INVENTION

The present invention is directed to electronic information displays and writer devices for such displays.

BACKGROUND OF THE INVENTION

Currently, most of price tags, price shelf labels, tickets, mass transportation passes and small signage are printed on paper. The disadvantage of displaying information on paper obviously is the consumption of paper, which not only is an environmental issue, but also a cost concern as the paper with information printed on must be discarded or recycled when the information needs to be updated. In addition, for certain time-sensitive systems, such as a pricing label or tag system, using paper to display information is labor intensive and often causes time delays and errors.

The concept of an electronic display device may be applied to these products. However, the high cost associated with an electronic display device prevents it from being widely used, especially for signs, labels, tickets and price tags which have to be regularly updated.

SUMMARY OF THE INVENTION

The present invention offers an electronic information display which can be updated at a very low cost. This is accomplished by an electronic display device and a separate writer device.

The first aspect of the invention is directed to an information display system, which comprises
  (a) an electronic information display comprising a display panel and a common electrode;
  (b) a writer device comprising a backplane, a writer contact pad and a display driver which directly or indirectly connects to the common electrode and the backplane.

In one embodiment, the electronic information display further comprises a common electrode contact pad which is capable of being in contact with both the common electrode and the writer contact pad in the writer device and the display driver connects to the writer contact pad and the backplane.

In one embodiment, the writer contact pad is capable of being in contact with the common electrode and the display driver connects to the writer contact pad and the backplane.

In one embodiment, the electronic information display further comprises a protective layer.

In one embodiment, the protective layer is non-conductive.

In one embodiment, the protective layer is formed from a material with anisotropic conductivity.

In one embodiment, the backplane is a segmented backplane.

In one embodiment, the backplane is an active matrix TFT backplane.

In one embodiment, the electronic information display is a price label or price tag.

In one embodiment, the electronic information display further comprises a bar code and the writer device further comprises a bar code reader.

In one embodiment, the electronic information display is an electronic ticket, an electronic sign or an electronic label.

In one embodiment, the writer device further comprises a conforming pressing mechanism to ensure contact between the backplane and the electronic information display.

In one embodiment, the display panel comprises display cells filled with an electrophoretic fluid.

In one embodiment, the system further comprises a wireless communication network linking the writer device to a computer data base.

In one embodiment, the updating of the information display is carried out on line.

In one embodiment, the updating of the information display is carried out off line.

In one embodiment, the information display further comprises a radio frequency identification system.

In one embodiment, the system further comprises a registration system to ensure alignment of the information display with the backplane in the writer device.

The second aspect of the invention is directed to an information display system, which comprises
  (a) an electronic information display comprising a display panel, a common electrode and a backplane; and
  (b) a writer device which comprises a display driver.

In one embodiment, the display driver comprises driver components.

In one embodiment, the backplane comprises driver components.

The third aspect of the invention is directed to an information display system, which comprises
  (a) an electronic information display comprising a display panel; and
  (b) a writer device which comprises a common electrode, a backplane and a display driver.

BRIEF DISCUSSION OF THE DRAWINGS

DETAILED DESCRIPTION OF THE INVENTION

Figure 1:
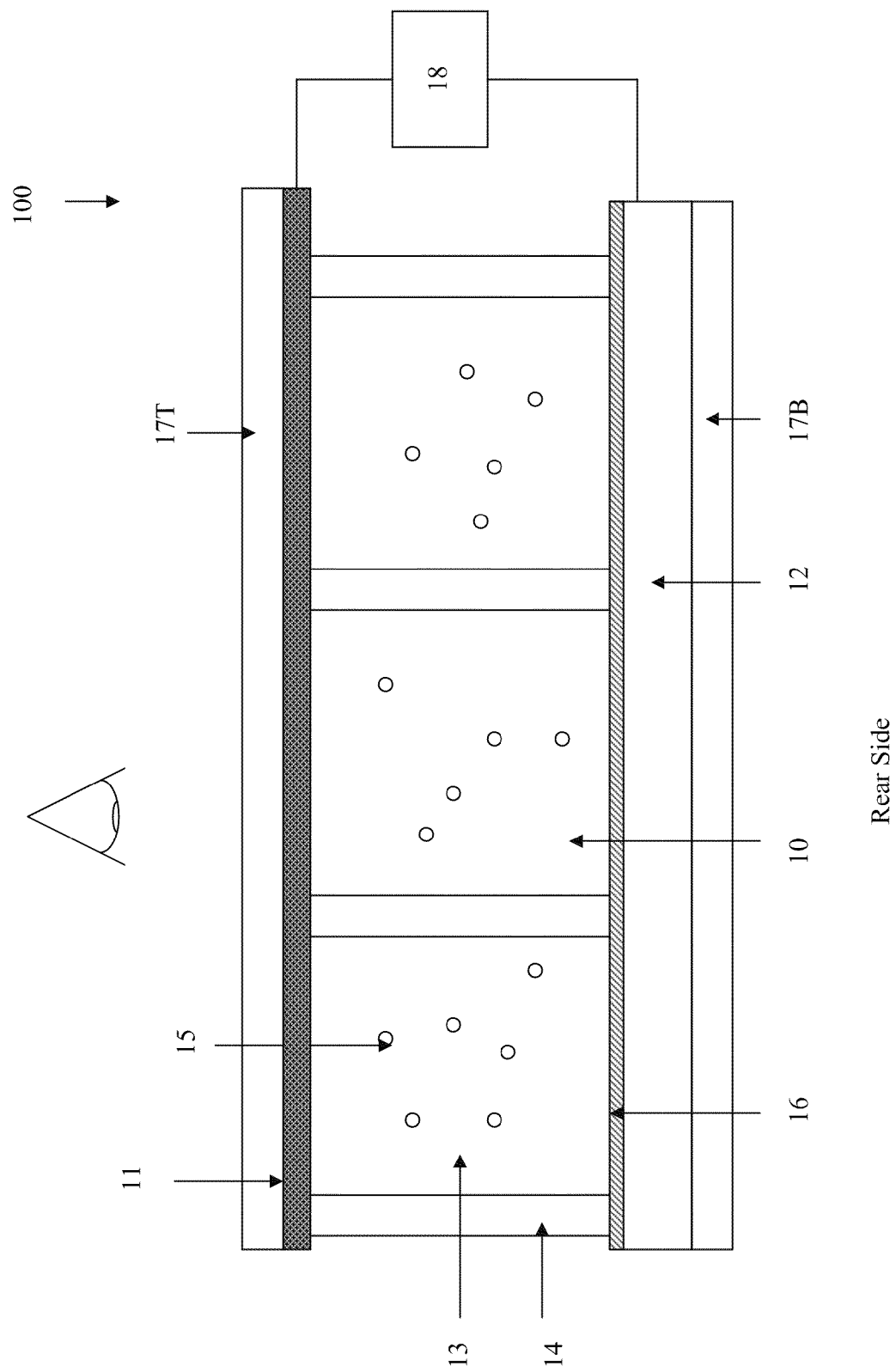
FIG. 1 depicts a typical electrophoretic display device.

FIG. 1 illustrates an electrophoretic display (100). In this figure, the display cells (10), on the front viewing side indicated with a graphic eye, are provided with a common electrode (11) (which is usually transparent and therefore on the viewing side). For brevity, the layer of display cells (10) is referred to as display panel.

On the opposing side (i.e., the rear side) of the common electrode (11), there is a backplane (12) which may be laminated to the display panel with an adhesive (16). An electrophoretic fluid (13) comprising charged pigment particles (15) dispersed in a solvent or solvent mixture is filled in each of the display cells.

In one embodiment, an electrophoretic fluid comprises only one type of charged pigment particles and the pigment particles may be positively or negatively charged. The charged particles may be white. Also, as would be apparent to a person having ordinary skill in the art, the charged particles may be dark in color and are dispersed in an electrophoretic fluid that is light in color to provide sufficient contrast to be visually discernable.

In another embodiment, the electrophoretic display fluid may have a transparent or lightly colored solvent or solvent mixture and charged particles of two different colors carrying opposite particle charges, and/or having differing electrokinetic properties. For example, there may be white pigment particles which are positively charged and black pigment particles which are negatively charged and the two types of pigment particles are dispersed in a clear solvent or solvent mixture.

The movement of the charged particles in a display cell is determined by the voltage potential difference applied to the common electrode and the backplane associated with the display cell in which the charged particles are filled. FIG. 1 shows that a display driver 18 is connected to both the common electrode (11) and the backplane (12).

The backplane (12) may be a segmented electrode layer or an active matrix electrode system comprising thin film transistors (TFT). It is also possible that the backplane and the common electrode are patterned to enable passive matrix operation.

Each of the display cells is surrounded by display cell walls (14). Typically, there are two substrate layers (17T and 17B) on the top and bottom sides of the display, respectively.

The term "display cell" is intended to refer to a microcontainer which is individually filled with a display fluid. Examples of "display cell" include, but are not limited to, microcups, microcapsules, micro-channels, other partition-typed display cells and equivalents thereof. In the microcup type, the display cells may be sealed with a sealing layer and there may also be an adhesive layer between the display panel and the common electrode.

In addition, while an electrophoretic display is specifically described, it is understood that the present invention may be applied to any type of bistable display devices, such as liquid crystal displays, electrochromic displays or liquid toner (particles in air) displays.

The electronic information display of the present invention may be an electronic sign, label, ticket, price tag or the like.

Figure 2:
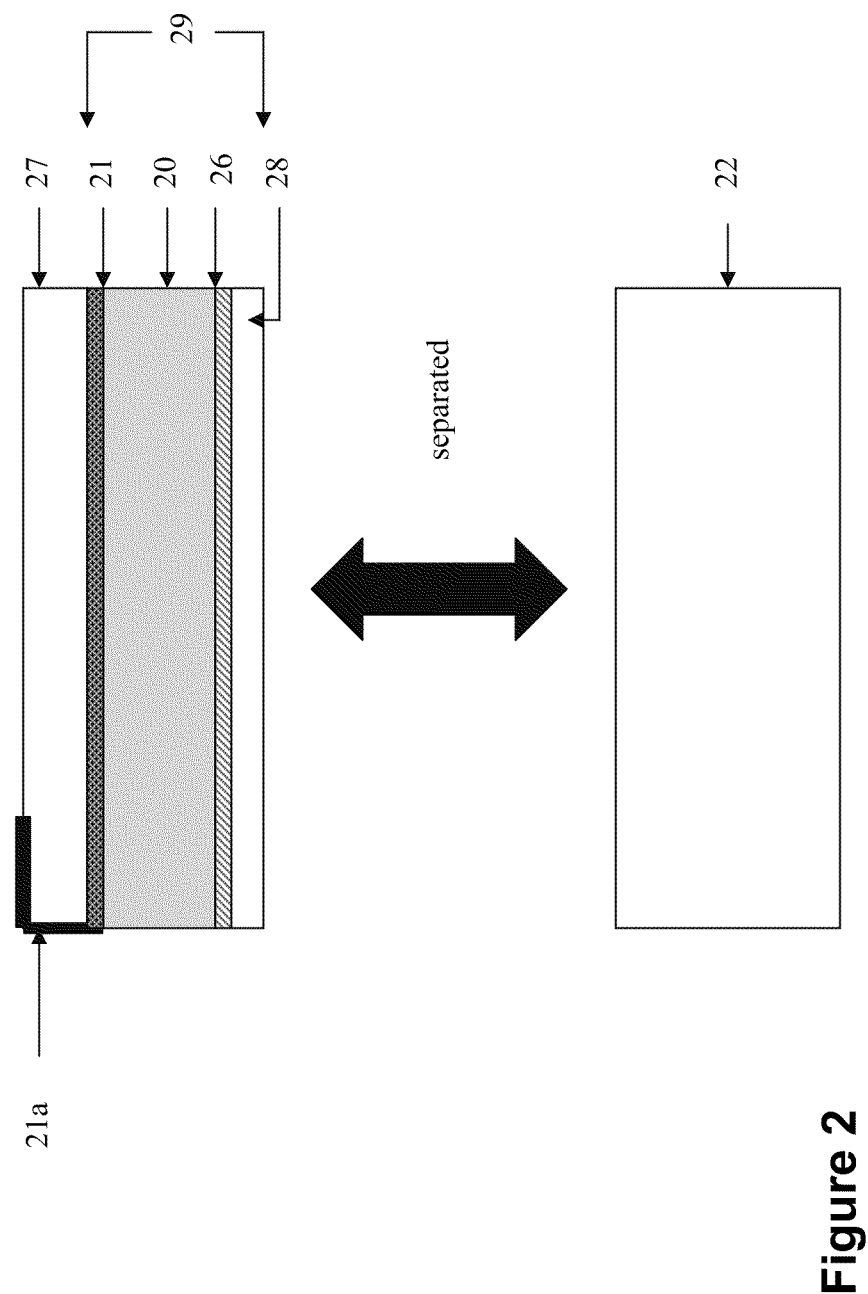
FIG. 2 illustrates an electronic information display of the present invention.

FIG. 2 is an example of an electronic information display of the present invention. In this design, the electronic information display (29) comprises a display panel (20), a common electrode layer (21) and an optional protective layer (28) laminated to the display panel with an adhesive (26). The layer (27) is a substrate layer. The backplane (22) is separated from the electronic information display (29).

The electronic information display also has a common electrode contact pad (21a) which is in contact with the common electrode (21). This contact pad and other contact pads mentioned this application are formed from a conductive material, such as a copper tape.

Figure 3A:
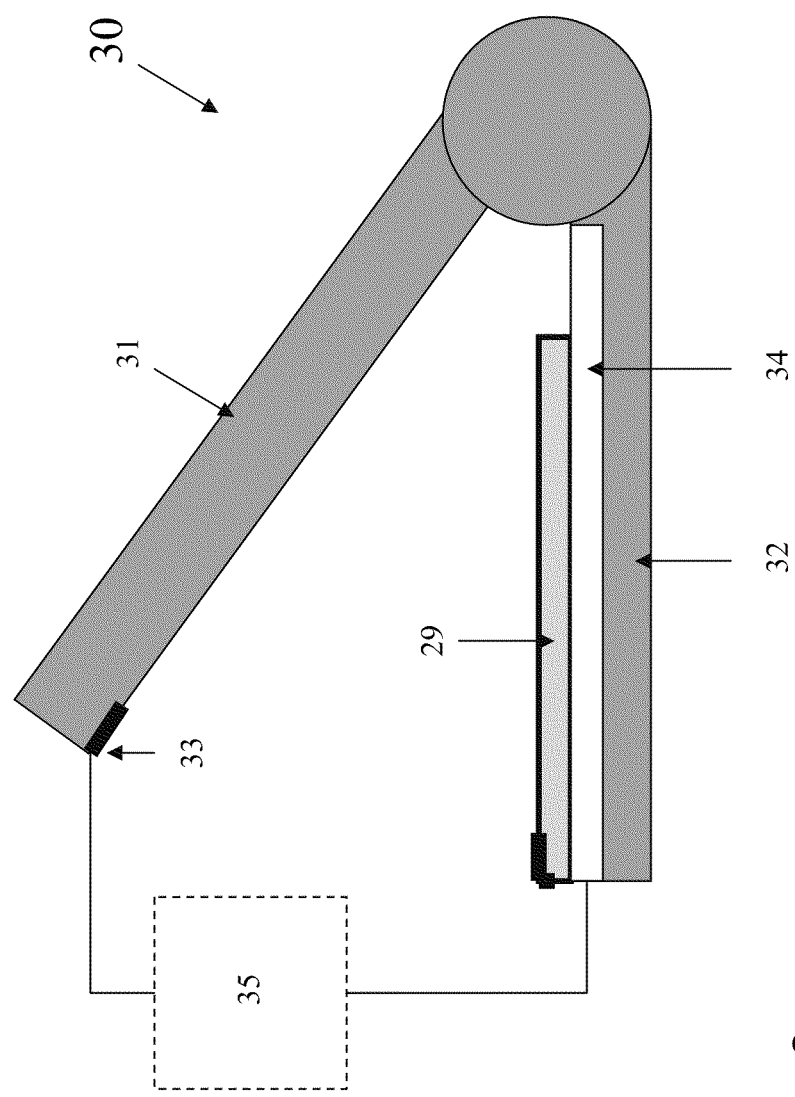
FIGS. 3a and 3b illustrate a writer device for an electronic information display of the present invention.
Figure 3B:
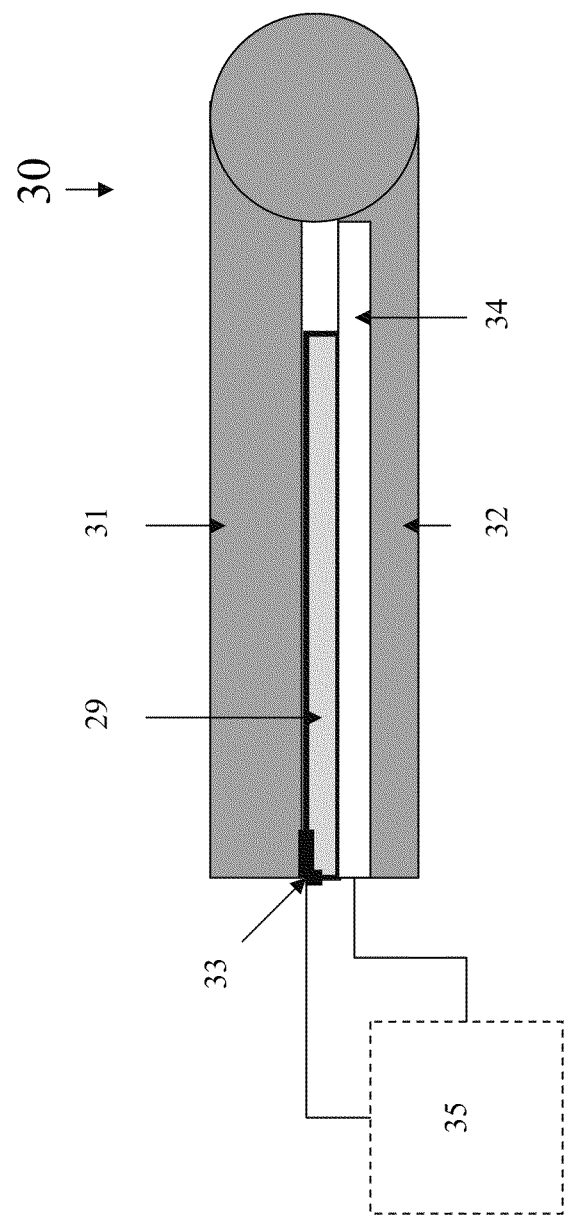

FIGS. 3a and 3b show a cross-section view of a writer device (30) for the electronic information display of the present invention. The writer device has a lid (or cover) (31), a body (receptacle) (32) and a display controller (35).

The lid (or cover) has a writer contact pad (33) which is capable of being in contact with the common electrode contact pad (21a) of the electronic information display.

The body (or receptacle) (32) of the device comprises a backplane (34). The backplane may be a segmented electrode layer (for simple signs) or an active matrix driving system (for more complicated images).

The writer device (30) may be in an open (FIG. 3a) or closed (FIG. 3b) position.

The writer contact pad (33) and the backplane (34) are connected to the display driver (35).

When an information display (e.g., 29) in FIG. 2 needs to display an image or an image on the information display needs to be altered or updated, the display is placed into the receptacle (32) of the writer device. When the writer device is closed (see FIG. 3b) with the information display in it, the display is pressed to be in contact with the backplane (34). In addition, the writer contact pad (33) is pressed to be in contact with the common electrode contact pad (21a). As a result, both the common electrode (21) of the information display and the backplane (34) are connected to the display driver (35).

The display driver issues signals to the circuits to apply appropriate voltages to the common electrode (21) and the backplane (34). More specifically, the display driver, based on the images to be displayed, selects appropriate waveforms and then issues signals, frame by frame, to the circuits to execute the waveforms by applying appropriate voltages to the common electrode and the backplane. Consequently, the desired images are displayed on the information display.

After updating, the information display is removed from the writer device.

Figure 4:
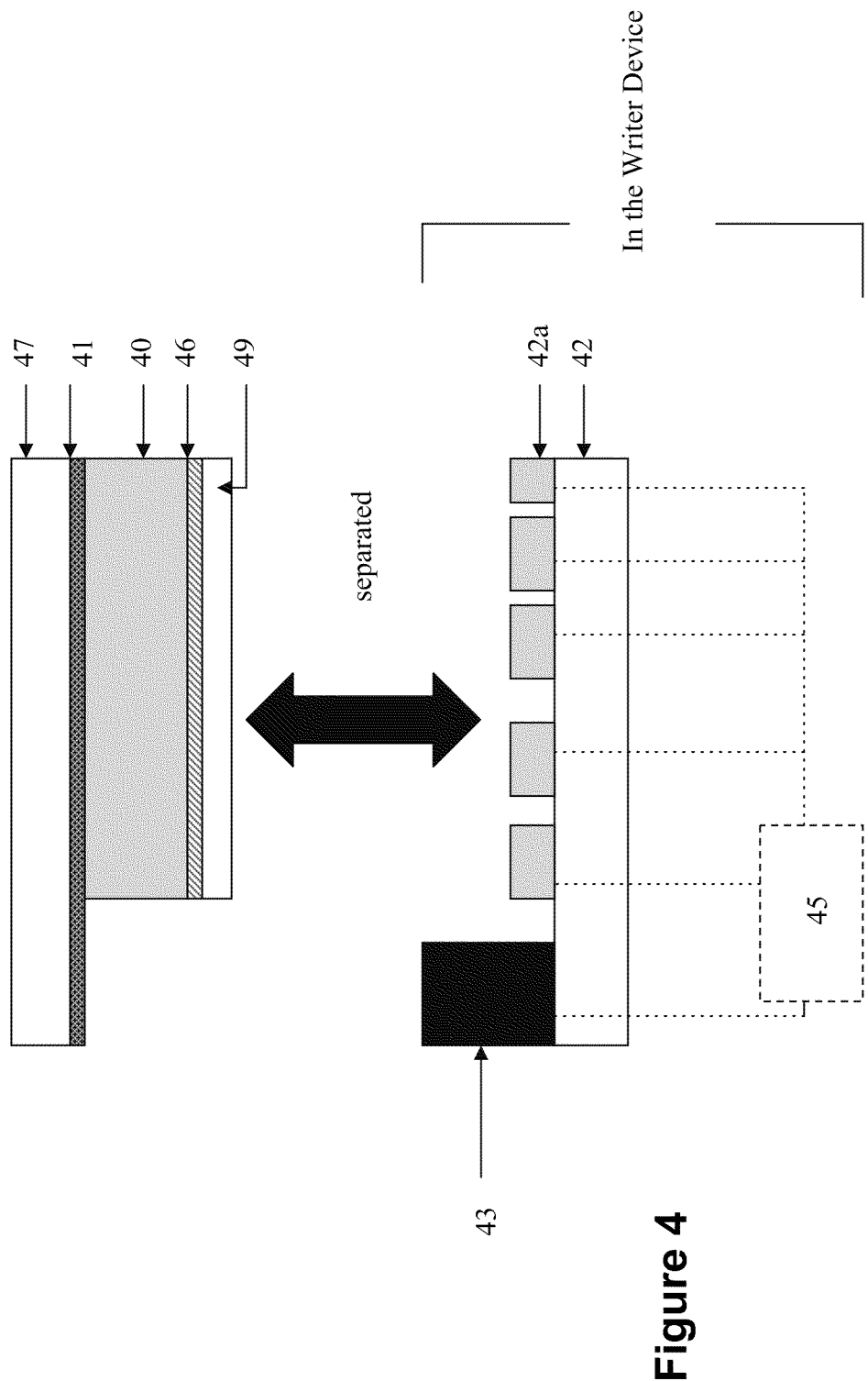
FIGS. 4, 5, 6a and 6b show alternative designs of an electronic information display and writer device.

FIG. 4 illustrates an alternative design. The backplane (42) in this case is also separated from the information display.

In this example, the information display comprises a display panel (40), a common electrode (41) and an optional protective layer (49) laminated to the display panel with an adhesive (46). The layer (47) is a substrate layer.

In this example, the backplane (42) separated from the information display is segmented, thus having a number of segment electrodes (42a).

For brevity, a writer device is not entirely shown. The backplane (42) with segment electrodes (42a) and a display driver (45) are in the writer device. In addition, there is a writer contact pad (43) on the backplane (42).

When the information display is placed in the writer device and the writer device is pressed closed, the writer contact pad (43) is in contact with the common electrode (41) and the segment electrodes (42a) are in contact with the information display.

The display driver (45) sends driving signals to the common electrode (41) through the writer contact pad (43) and each of the segment electrodes (42a), thus generating a desired image on the information display. After the images are generated or updated, the information display is removed from the writer device.

Figure 5:
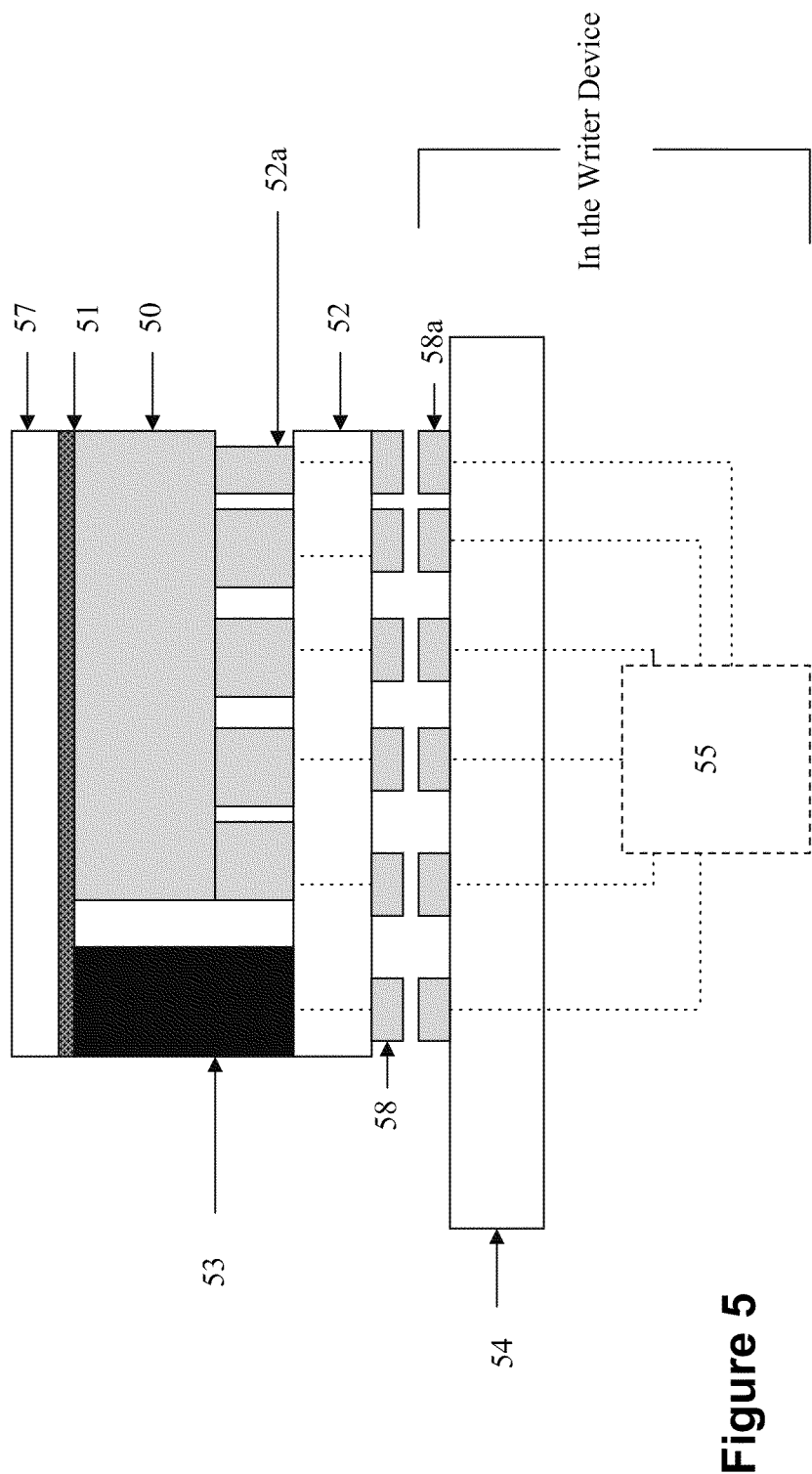

FIG. 5 illustrates a further alternative design. In this design, the backplane (52) is attached to the information display; but the driver components (such as the display driver chip, controller and battery) are within a display driver (55), not within the backplane (52).

The information display comprises a display panel (50), a common electrode (51) and a backplane (52). The layer (57) is a substrate layer.

In this example, the backplane (52) is also segmented, thus having segment electrodes (52a). At the back of the backplane, there are a series of contact pads (58), which are individually connected to the common electrode (51) through a contact pad (53), and to the segment electrodes (52a).

For brevity, the writer device is not entirely shown. In the writer device, there are at least a support member (54) with contact pads (58a) which individually correspond to the contact pads (58) on the backplane (52), and a display driver (55). The display driver sends driving signals to the common electrode through the contact pad (53) and a pair of contact pads

(58) and (58a) and sends driving signals to each of the segment electrodes (52a) through each corresponding pair of contact pads (58) and (58a).

After the image on the information display has been updated, the information display panel and the backplane attached to it are removed from the writer device.

In another embodiment of the design shown in FIG. 5, some of the driver components may be in the backplane. This alternative design would be more costly to implement.

Figure 6A:
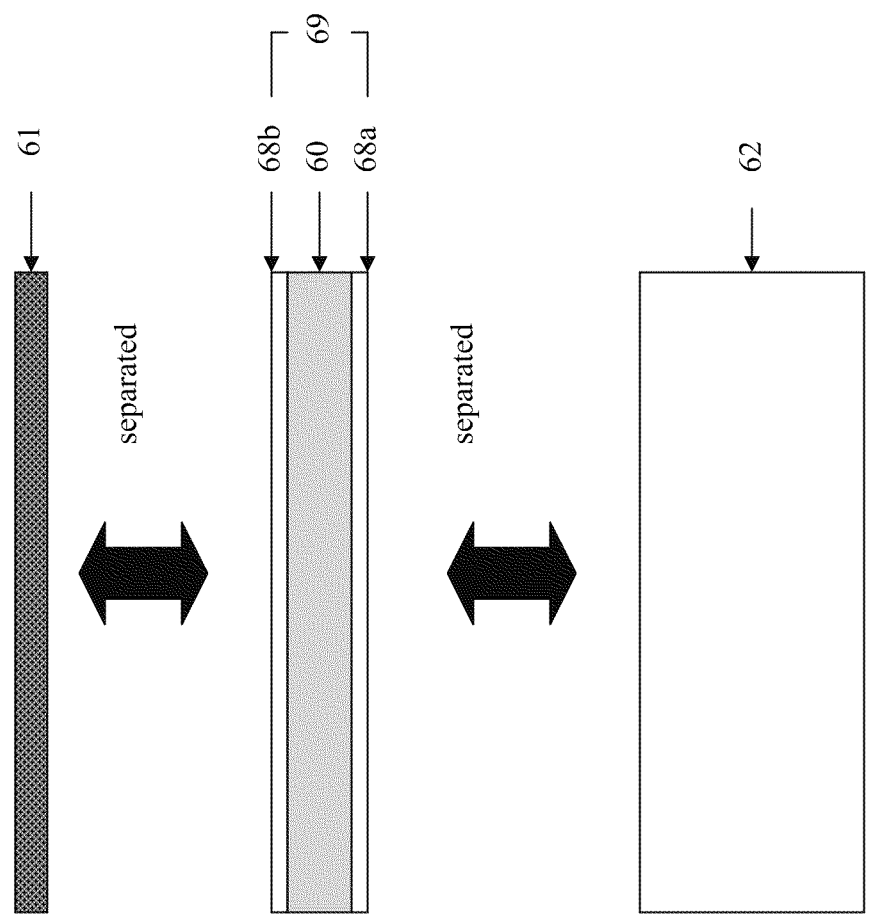
Figure 6B:
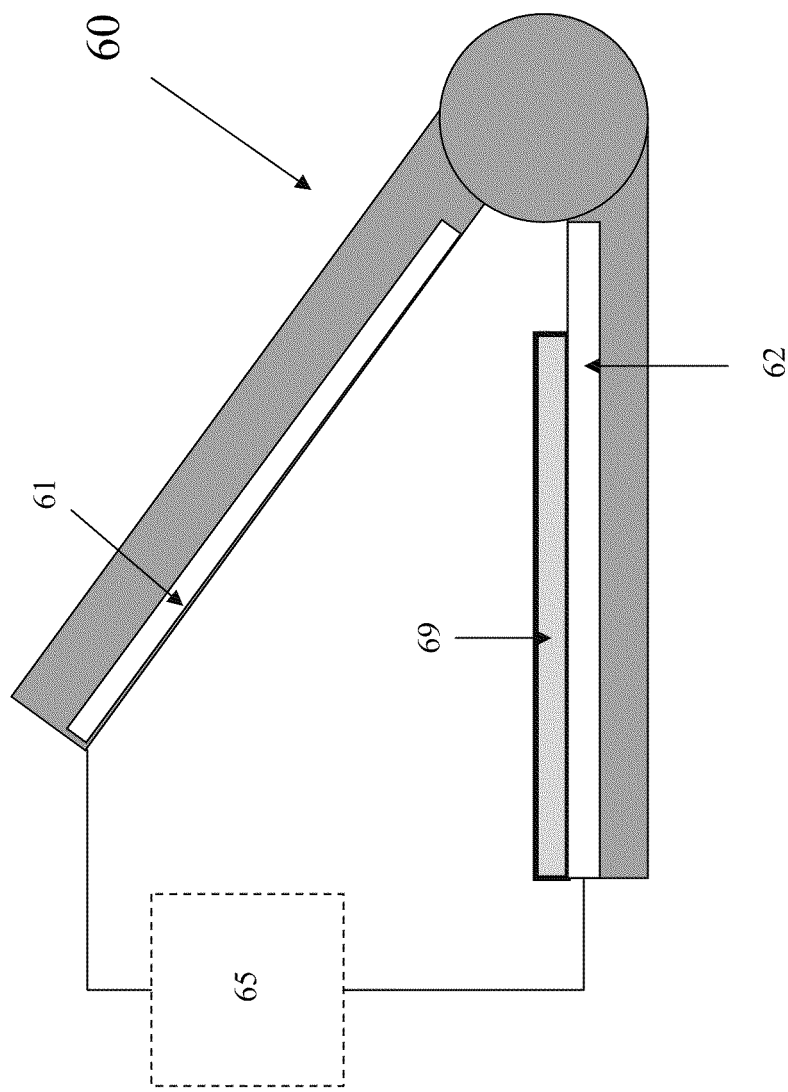

FIGS. 6a and 6b illustrate another alternative design. In this example, both the common electrode (61) and the backplane (62) are separated from the information display (69) which comprises a display panel (60) and optional protective layer (68a and 68b), as shown in FIG. 6a. The writer device (60) comprises a common electrode (61) and a backplane (62), both of which are connected to a display driver (65), as shown in FIG. 6b. The electronic information display, in this case, does not include the common electrode. When the information display (69) needs updating, the display is inserted into the writer device. When the writer device is in the closed position, the display is in contact with both the common electrode and the backplane and driven by the display driver (65). After the updating is completed, the display panel is removed from the writer device.

In all embodiments of the present invention, the writer device may further comprise a wireless network and computational infrastructure which connect the writer device to a database. The wireless communication network incorporated into the writer device may be 802.11b, ZigB, Blue Tooth or the like.

In all embodiments, there is a built-in registration system which aligns the information display to the backplane or the common electrode and the backplane, in the writer device.

It is also important in any of the designs of the present invention that the backplane has good contact with the information display when the information display is placed in the writer device, in order to transfer the voltage efficiently. In one embodiment, there may be a conformal pressing mechanism, such as a compressible layer placed underneath the backplane. The compressible layer is flexible, which would force the backplane to conform easily to the information display, even if the contact surface between the information display and the backplane is not smooth, thus ensuring good contact. This also applies to the segment electrodes, and a common electrode if it is present in the writer device.

The protective layer in all of the designs illustrated above is optional. The protective layer, if present, may be conductive or non-conductive.

The voltage potential applied to the common electrode and the backplane is divided among the protective layer, the adhesive layer and the display medium, depending on the dielectric constant and resistance of each layer and the medium. If the resistivity of the display medium is high, and the protective layer is non-conductive, then the protective layer must be thin so that most the voltage potential would drop across the display medium. If the resistivity of the display medium is low, then the protective layer must have a higher vertical conductivity so that it does not absorb too much of the voltage drop, and in this case, the lateral conductivity of the protective layer must be low enough so as not to cause shorting of the segmented electrodes and destroy the images. This may be accomplished by using a material with anisotropic conductivity to form the protective layer (i.e., high conductivity in the vertical axis and low conductivity in the horizontal axis). The protective layer may be a layer whose bulk conductivity is chosen in conjunction with the layer thickness. Suitable materials for this protective layer may include, but are not limited to, conductive polymers and polymers with a high content of conductive particles.

Since the display device is bistable, the images displayed by the electronic information display would remain until the next update. The advantage offered by the present invention is that the information display could have only the display panel and a common electrode as the main components, which are relatively inexpensive. The more expensive components, such as the backplane, the processor, the wireless communication network, the battery and the display driver, are built into the writer device. A single writer device can be used repeatedly for updating a significantly large number of the information displays.

In addition, in order to ensure clean surface of the information display for good contact between the information display and the backplane in the writer device, the information display is preferably protective by a retractable protective sleeve. The information display is removed from the sleeve and placed in the writer device when it needs to be updated. After the updating is completed, the information display is removed from the writer device and placed back in the protective sleeve. The protective sleeve may be formed from a clear plastic material.

The current system for labeling prices in a modern retail environment uses price tags applied to every retail item and price labels applied to every product bin. When the price is to be updated, a store employee will generally find the price tag to be updated, either by a physical search or by an RFID (radio frequency identification) locator. Once the item is found, a pricing gun is synchronized to the item by reading a bar code on the current tag, prints out a new tag; the operator then pastes it on top of the existing one. In older stores, the process may be limited to physical search and offline printing.

In recent years, the pricing signs, and in some cases, even the price tags have been replaced with electronic shelf labels which are wirelessly driven by a store central computer. In this latter configuration, every update in the store POS (point of sale) data base is reflected in the label price very quickly, leading to a rapid update and fewer errors.

While the value of rapid updating of pricing labels and signs is well understood, none of the current systems satisfy such needs. For example, keeping paper price labels up to date and updating them quickly when prices change is very labor intensive which could cause time delays and errors. As to electronic pricing labels and signs, they solve the problems of time delays and have fewer errors; but the costs associated for such labels and tags are prohibitively high compared to paper labels. Therefore the electronic labels and signs are primarily used by early adaptors or in places where government imposed fines related to pricing integrity.

The electronic information display and writer device as described in the above sections can be easily adapted for a pricing sign and label system. It is assumed that the writer device is manually applied to the electronic signs or tags by a store employee, although automated systems for a large number of tags can easily be envisioned.

Figure 7:
FIG. 7 illustrates a typical price tag.

FIG. 7 shows a typical price tag. The tag displays a bar code which links the merchandise to a point of sale (POS) data base, the current price of the merchandise, and other product related information. Other items not shown in this sample price tag may include, but are not limited to, past price, sale price or unit price.

Based on one embodiment of the present invention, the backplane is built into a writer device which could be stationary or portable. If it is portable, it can be carried by the store employees. In this mode of operation, the employee either manually locates the merchandise for which the prices are to be updated or pings the RFID transmitter to locate such merchandise. Once identified, the employee places the information display into a writer device and closes the writer device, for example, as shown in FIGS. 3a and 3b. After the pricing has been updated, the employee removes the price labels or tags out of the writer device.

Utilizing the present invention, a retail store may only need a limited number of the writer device, while the store may have thousands to millions of pricing signs and tags to be regularly updated, rendering the system very affordable.

Figure 8:
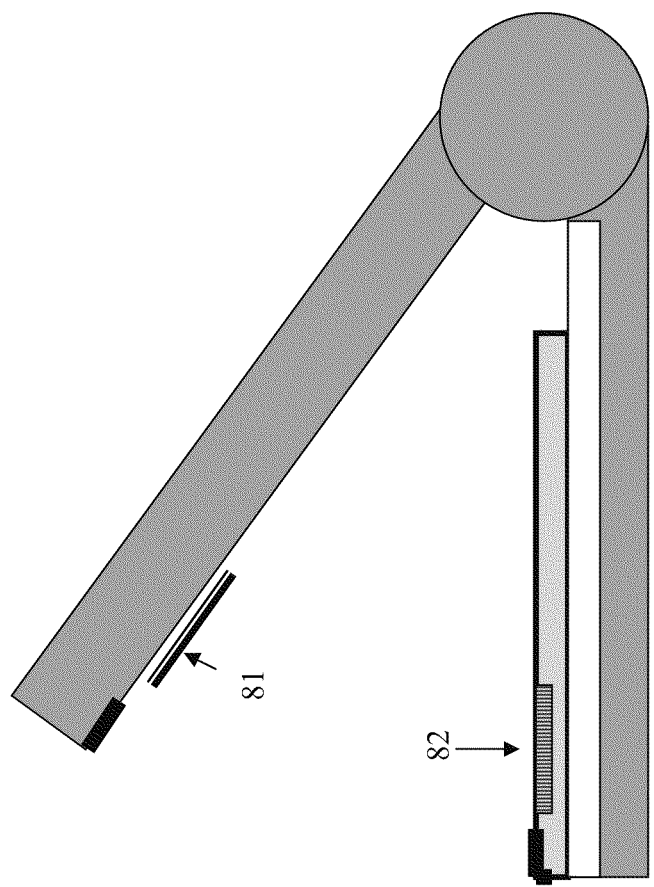
FIG. 8 illustrates how a price tag may be updated by a writer device.

FIG. 8 shows a writer device which is particularly suitable for updating price labels or tags. In this writer device, there is a bar code reader (81) which can read the bar code (82) on a price tag, when the writer device is in the close position. The reader reads the bar code, communicates with the POS data base, and then writes or updates the price label or tag. The entire updating process may be carried out via a wireless communication network.

The price labels and tags may be written or updated "on line" at the merchandise location. Alternatively, the writing and updating process may be carried out in an automated off line system and then the updated tags or labels are brought to the merchandise location and placed on the shelves or merchandise.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An information display system comprising:
(a) an electronic information display comprising a display panel, a common electrode and a common electrode contact pad, wherein the electronic information display is separated from a backplane which is in a writer device; and
(b) the writer device comprising the backplane, a writer contact pad and a display driver, wherein the common electrode contact pad is connected to the common electrode, the display driver is connected to the writer contact pad and to the backplane and when the common electrode contact pad is in contact with the writer contact pad, which allows the display driver to be connected to the common electrode and to the backplane for altering or updating images on the electronic information display.

2. The system of claim 1, wherein said electronic information display further comprises a protective layer.

3. The system of claim 2, wherein said protective layer is non-conductive.

4. The system of claim 2, wherein said protective layer is formed from a material with anisotropic conductivity.

5. The system of claim 1, wherein said backplane is a segmented backplane.

6. The system of claim 1, wherein said backplane is an active matrix TFT backplane.

7. The system of claim 1, wherein said electronic information display is a price label or price tag.

8. The system of claim 1, wherein said electronic information display further comprises a bar code and said writer device further comprises a bar code reader.

9. The system of claim 1, wherein said electronic information display is an electronic ticket, The an electronic sign or an electronic label.

10. The system of claim 1, wherein said writer device further comprises a conforming pressing mechanism to ensure contact between the backplane and the electronic information display.

11. The system of claim 1, wherein said display panel comprises display cells filled with an electrophoretic fluid.

12. The system of claim 1, further comprising a wireless communication network linking the writer device to a computer data base.

13. The system of claim 1, wherein the updating of the electronic information display is carried out on line.

14. The system of claim 1, wherein the updating of the electronic information display is carried out off line.

15. The system of claim 1, wherein said electronic information display further comprises a radio frequency identification system.

16. The system of claim 1, further comprising a registration system to ensure alignment of the electronic information display with the backplane in the writer device.

* * * * *